C. L. BEST.
SPROCKET CHAIN.
APPLICATION FILED JULY 16, 1920.

1,424,441.

Patented Aug. 1, 1922.
3 SHEETS—SHEET 1.

Witness:
Jas E Hutchinson

Inventor:
Clarence L. Best,
By
Milans & Milans, Attorneys

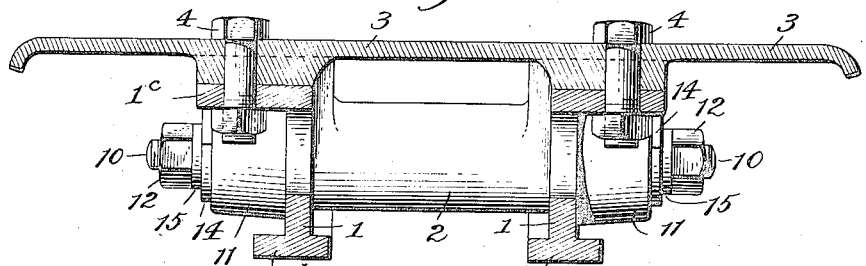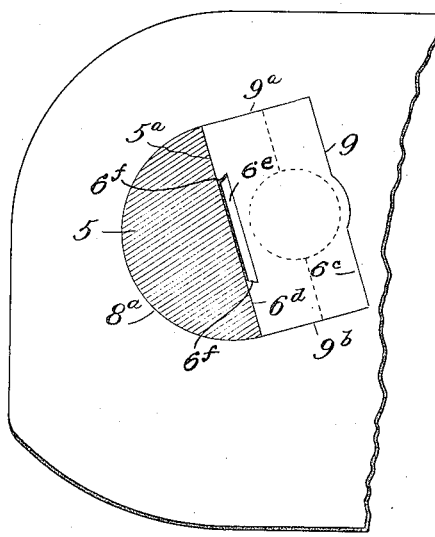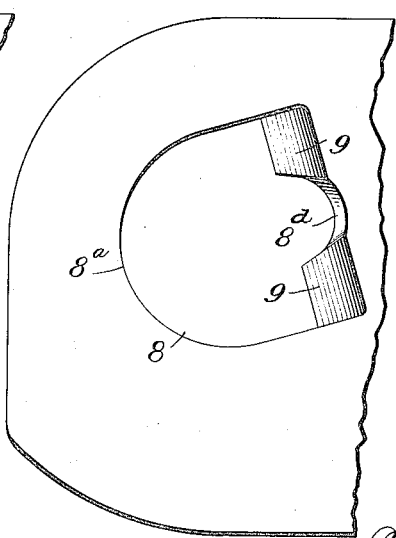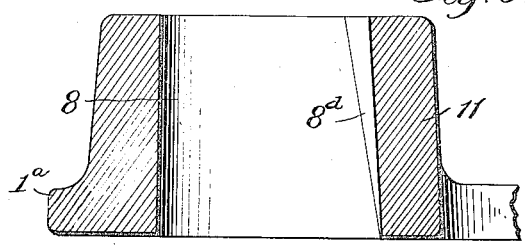

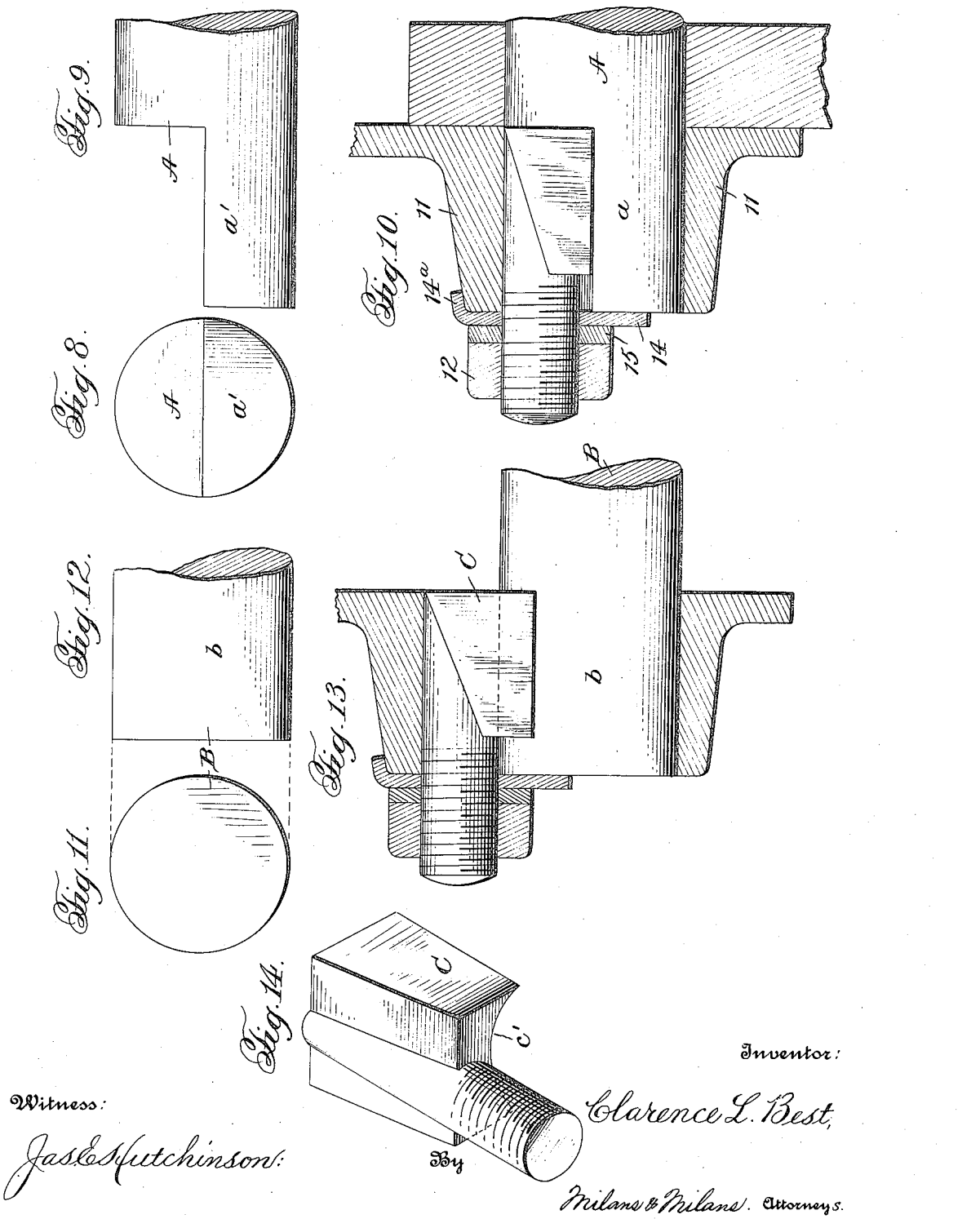

UNITED STATES PATENT OFFICE.

CLARENCE LEO BEST, OF ELMHURST, CALIFORNIA, ASSIGNOR TO C. L. BEST GAS TRACTION COMPANY, OF SAN LEANDRO, CALIFORNIA, A CORPORATION OF CALIFORNIA.

SPROCKET CHAIN.

1,424,441.  Specification of Letters Patent.  Patented Aug. 1, 1922.

Application filed July 16, 1920. Serial No. 396,818.

*To all whom it may concern:*

Be it known that I, CLARENCE LEO BEST, a citizen of the United States, residing at Elmhurst, in the county of Alameda and State of California, have invented certain new and useful Improvements in Sprocket Chains, of which the following is a specification, reference being had therein to the accompanying drawing.

This invention relates to improvements in sprocket chains and particularly to sprocket chains for endless tracks for traction engines, to chains of the type employing hinged pintles or members formed separately from the links and fitting in openings therein.

The object of the invention is to improve this type of chain, to provide simple means for securing the hinge members in the socket openings of the links that will prevent the hinge members from working loose, changing their angular position in the link, and the consequent wear and loosening of the chain, to provide securing means of this nature that is readily adjustable to compensate for hinge members of varying size in cross section and variation in the size of the socket openings, due to imperfect construction in the first instance or the use of old parts whereby the use of cast metal parts is made practical, the necessity for machine work and grinding commonly required avoided, a more durable efficient chain being afforded that can be produced at low cost.

The invention, with other objects and advantages thereof, and the particular construction, combination and arrangement of parts comprising the same will be understood from the following detailed description when considered in connection with the accompanying drawings forming part hereof and illustrating embodiments of the invention.

In the drawings:—

Figure 3 is a transverse section of one of the links with the tread plate attached.

Figure 4 is a detail side elevation of one end portion of one of the link members, showing the strut in section, and the wedge member in edge elevation.

Figure 5 is a view similar to Fig. 3 without the strut and wedge member.

Figure 6 is a section on the line 6—6 of Fig. 5.

Fig. 7 is a detail perspective view of the wedge member.

Figures 8 and 9 are detail views on an enlarged scale of a slightly modified form of strut.

Figure 10 is a section through one end portion of one of the links illustrating the use of the modified strut of Figs. 8 and 9 with the fastening means applied.

Figures 11 and 12 are, respectively, detailed end and side elevations of an end portion of a further modified form of strut.

Figure 13 is a horizontal section through an end portion of one of the side plates or members illustrating a slightly modified form of wedge member in accordance with the modified structure illustrated in Figs. 11 and 12.

Figure 14 is a detailed perspective of the wedge member of the construction illustrated in Fig. 13.

Figure 1:
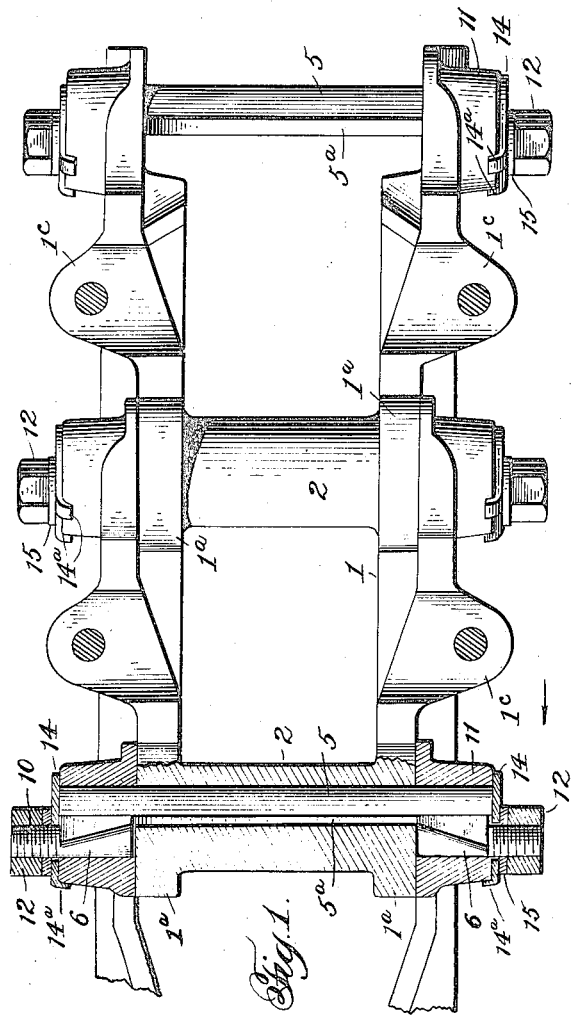
Figure 1 is a top plan view of a short stretch of chain constructed in accordance with the present invention, the same being shown as it appears in the upper run of the chain, the direction of movement of the chain being indicated by the arrow.

While in the drawings I have illustrated a specific embodiment of the invention, it will of course be understood that variations and changes in the particular constructions shown, the application thereof to other designs of link structure, and the carrying out of the invention in other forms as will appeal to those skilled in the art and falling within the scope of the appended claims, may be practiced without departing from the principles of the invention.

Figure 2:
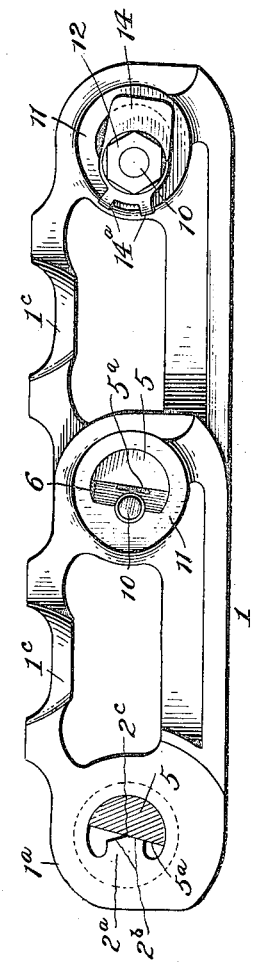
Figure 2 is a side elevation.

Referring particularly to Figs. 1 to 7, inclusive, the endless traction chain structure illustrated is made up of a plurality of links, each comprising spaced side plates or members 1, 1, between which at one end is provided a sleeve or tubular block 2 rigidly secured at each of its ends to the side plates. The side plates or members have inward offset portions 1$^a$ and are adapted to be arranged in the overlapping relation shown, said plates having upper track bars 1$^b$ and apertured lugs 1$^c$ to which are secured tread plates 3 by bolts 4. Interiorly of the sleeve or tubular block 2 is provided a longitudinally extending radially arranged rib 2$^a$ extending to the axis of the sleeve and tapering or decreasing in thickness (as shown), from a point near its base to the outer end thereof, providing broad bearing faces 2$^b$ at each side, and an intermediate knife-edge bearing 2$^c$. Between the plates at the opposite ends from the location of the sleeve or tubular block 2 is a strut or hinge bearing member 5 of less diameter than the interior diameter of the sleeve or tubular block 2, and adapted to work within the sleeve, the strut 5 being substantially semicircular shape in cross section and having a flat working surface 5$^a$ extending longitudinally thereof along its axis adapted to cooperate with the rib 2$^a$ to afford a rolling contact between the parts at the axial center of the hinge motion of the links. The strut 5 is rigidly secured at each of its ends to the side plates 1, 1 with its working face 5$^a$ set at the proper angle so that in turning about the sprocket wheels (not shown), a line contact rocking bearing is afforded, while when the links occupy a horizontal position in a straight pull of the chain, the flat working face 5$^a$ of the strut will rest flat against one of the flat bearing faces 2$^b$ of the rib 2$^a$, and a bearing of increased area is provided.

In the present instance the side plates 1, 1 and sleeve or tubular block 2 is shown in the form of a single casting, the sleeve or tubular block serving as connecting means for the side plates or members. The strut 5 is a separate casting and has its end portions seated in socket openings in the side plates.

In accordance with the present invention, means for rigidly securing the separate struts or hinge members 5 to the side plates 1, 1 in the socket openings thereof is provided, said means including a wedge 6 adapted to be positioned in the socket opening between a wall thereof and a wall of the strut or bearing member. In the particular construction illustrated (Figs. 1 to 7, inclusive), the socket opening 8 has a curved wall 8$^a$ semicircular to correspond with the curved face of the semicircular cross sectional form of the strut 5. At the left of the opening to receive the end portion of the strut, an adjoining opening is provided to accommodate the wedge 6, the latter opening having a flat inclined end wall 9 and straight top and bottom walls 9$^a$, 9$^b$ merging into the curved wall 8$^a$. The wedge 6, which is in the form of metal block has straight upper and lower faces 6$^a$, 6$^b$, and an inclined flat face 6$^c$ to work upon the inclined wall 9 of the socket opening, and a wall 6$^d$ corresponding in shape to and fitting against the flat wall 5$^a$ of the strut or bearing member 5, the wall 6$^d$ being flat except for a central groove 6$^e$ to provide longitudinally extending gripping edges 6$^f$.

The wedge 6 has an integrally threaded stem part 10 projecting from one end thereof and adapted, when the parts are assembled, to project beyond the outer side of the side plates 1, 1 and the tubular bosses or integral projections 11 of the plates 1, 1, the inclined wall 9 of the socket being provided with a recess 8$^d$ for the threaded stem. 12 is a clamp nut on the threaded stem part 10, and 14 and 15 are washers interposed between the nut 12 and boss 11, the washer 14 being in the form of a plate extending over the socket opening and provided with locking tongues 14$^a$ adapted to be bent down over a side face of the boss 11. As will be understood, by turning the nut 12 up against the washers 14 and 15, the wedge will be drawn transversely of the link to tightly bind the ends of the strut or bearing member against the socket wall, and the strut will be securely held from turning in the socket relatively to the link member.

Separate struts or bearing members of different cross sectional shapes may be employed, for instance that shown in Figs. 8 and 9, in which the strut is designated A, the strut in this instance being circular for the greater portion of its length and provided with semicircular end portions $a'$ to fit within the socket openings of the links.

In Figs. 11 and 12 separate strut members B are shown which have end portions $b$ that are circular in cross section, the construction of the wedge member C when this form of strut is employed being the same as that previously described except that the face $c'$ thereof for engaging the end portion of the strut is curved, as shown in Fig. 14, to conform to the curved end face of the strut. As will be understood by this modification of the pintle or strut-engaging face $c'$ of the wedge, the latter may be located upon either the rear or wear side of the strut or at the opposite side thereof.

As will be understood, when the cylindrical form of struts, illustrated in Figs. 8, 9, 11 and 12, are employed, the tubular block 2 has a cylindrical inner face to correspond with the cylindrical contour of the struts A B.

The present invention provides simple and efficient means for securely fastening the separate struts or bearing members in the sockets of the links against rocking or working loose out of set position, the invention being especially advantageous in sprocket chains of the type employing hinged bearing members constructed to provide a line contact rocking bearing when the links turn about the sprocket wheels, and a bearing of increased area upon a direct pull upon the chain, an example of this type of device being illustrated in Figs. 1 to 7, inclusive in the drawings. The special securing means provided is adjustable to compensate for struts or bearing members of various sizes in cross section, and variation in the size of the socket openings in the links, thus permitting of the use of cast metal structures, the necessity for machine work and grinding commonly required being entirely avoided, and a more durable efficient chain afforded that can be provided at low cost.

What I claim is:—

1. In a sprocket chain, link members, means for hinging adjacent link members together comprising a pair of cooperating transversely extending bearing members, one on each link, the bearing member of one link being formed as a separate part and provided at one end with a flat side face, and the link having a socket opening in which said end portion of the bearing member seats, the wall of the socket opening having an inclined face portion, a wedge member extending into the socket opening between the wall thereof and the flat face of the end portion of the bearing member, said wedge member having an inclined face to cooperate with the inclined face portion in the wall of the socket, and adjusting means for said wedge member.

2. In a sprocket chain, link members, means for hinging adjacent link members together comprising a pair of cooperating transversely extending bearing members, one on each link, the bearing member of one link being formed as a separate part, and a link having a socket opening in which an end portion of the bearing member seats, the wall of the socket opening having a flat inclined face portion, a wedge member extending into the socket opening between the wall thereof and the end portion of the bearing member, said wedge member having a flat inclined face to cooperate with the flat inclined face portion of the wall of the socket, and adjusting means for said wedge member.

3. In a sprocket chain, link members, means for hinging adjacent link members together comprising a pair of cooperating transversely extending bearing members, one on each link, the bearing member of one link being formed as a separate part, and the link having a socket opening in which an end portion of the bearing member seats, a wedge member extending transversely of the link member in the socket opening between a wall thereof and a wall of the bearing member for adjustment longitudinally of the bearing member, means for adjusting the wedge member comprising a threaded stem on one of said last mentioned members extending from one side of the link, and a nut on the stem, and a plate portion between the nut and side face of the link, said plate portion extending over the socket opening.

4. In a sprocket chain, link members, means for hinging adjacent link members together comprising a pair of cooperating transversely extending bearing members, one on each link, the bearing member of one link being formed as a separate part, and the link having a socket opening in which an end portion of the bearing member seats, a wedge member extending transversely of the link member in the socket opening between a wall thereof and a wall of the bearing member for adjustment longitudinally of the bearing member, means for adjusting the wedge member, comprising a threaded stem on one of said last mentioned members extending from one side of the link, a nut on the stem, and a plate on the stem between the nut and side face of the link, said plate extending over the socket opening.

5. In a sprocket chain, link members, means for hinging adjacent link members together comprising a pair of cooperating transversely extending bearing members, one on each link, the bearing member of one link being formed as a separate part and the link having a socket opening in which an end portion of the bearing member seats, a wedge member extending transversely of the link member in the socket opening between a wall thereof and a wall of the bearing member for adjustment longitudinally of the bearing member, and means for adjusting the wedge member comprising a threaded stem on the wedge member extending from one side of the link, and a nut on the stem.

6. In a sprocket chain, link members, means for hinging adjacent link members together, comprising a pair of cooperating transversely extending bearing members, one on each link, the bearing member of one link being formed as a separate part, and the link having a socket opening in which an end portion of the bearing member seats, a wedge member extending transversely of the link member in the socket opening between a wall thereof and a wall of the bearing member for adjustment longitudinally of the bearing member, means for adjusting the wedge member comprising a threaded stem on the wedge member extending from one side of the link, a nut on the stem, and a plate on the stem between the nut and link extending over the socket opening, said plate having a portion to interlock with a portion of the link.

7. In a sprocket chain, link members, means for hinging adjacent link members together comprising a pair of cooperating transversely extending bearing members one on each link, the bearing member of one link being formed as a separate part and the link having a socket opening in which an end portion of the bearing member seats, said link having an integral lateral projecting part or boss adjoining the socket opening, a wedge member extending transversely of the link member in the socket opening between a wall thereof and a wall of the bearing member for adjustment longitudinally of the bearing member, means for adjusting the wedge member comprising a threaded stem on the wedge member extending from one side of the link beyond said boss, a nut on the stem, and a washer plate on the stem between the nut and boss extending over the socket opening, said plate being provided with an angular tongue to interlock with the side face of the boss.

8. In a sprocket chain, link members, and means for hinging adjacent hinge members together, comprising a pair of cooperating bearing members one on each link, the bearing member of one link being formed as a separate part and having an end portion provided with a curved side face and a flat side face portion, and the link having a socket opening to receive said end portion of the bearing member, the socket opening being provided with a curved inner face portion and an inclined flat face portion, a wedge member seated in the socket opening between the wall thereof and the flat side face of said end portion of the bearing member for adjustment transversely of the link, said wedge member having a flat inclined face to co-operate with the flat inclined face portion of the wall of the socket opening, and means for adjusting said wedge member.

9. In a sprocket chain, link members, means for hinging adjacent link members together, comprising a pair of cooperating hinged bearing members, one on each link, the bearing member of one link being formed as a separate part and having an end portion partly circular in cross section with a flat wall at one side, and the link having a socket opening with a partly circular part to receive an end portion of the bearing member, and an adjoining part with a flat inclined wall, a wedge seated in the socket opening between the flat face of the bearing member and the inclined wall of the socket, said wedge having an inclined face to work on the inclined face of the socket, and with a surface parallel with and engaging the flat surface of the bearing member, and means for adjusting the wedge.

10. In a sprocket chain, link members, means for hinging adjacent link members together, comprising a pair of cooperating hinged bearing members, one on each link, the bearing member of one link being formed as a separate part and having an end portion partly circular in cross section with a flat wall at one side, and the link having a socket opening with a partly circular part to receive an end portion of the bearing member, and an adjoining part with a flat inclined wall, a wedge seated in the socket opening between the flat face of the bearing member and the inclined wall of the socket, said wedge having an inclined face to work on the inclined face of the socket, and with a surface parallel with and engaging the flat surface of the bearing member, and means for adjusting the wedge including a threaded stem on the wedge extending longitudinally from one end thereof, the inclined wall of the socket opening being recessed to accommodate said stem.

11. In a sprocket chain, link members, means for hinging adjacent link members together comprising a pair of cooperating bearing members, one on each link, the bearing member of one link being formed as a separate part and having an end portion with a curved face, and the link having a socket opening provided with a curved wall to receive an end portion of the bearing member, and with a flat inclined wall, a wedge member seated in the socket opening having a flat inclined face to work upon the inclined wall of the socket, and with a face corresponding in shape to and engaging the adjacent face of the bearing member.

12. In a sprocket chain, link members, means for hinging adjacent link members together comprising a pair of bearing members in rolling contact, one of the bearing members having a convex working face including flat faces at opposite sides, and the working face of the other member being substantially flat, said bearing members being arranged to have a greater area of surface in contact when the chain is pulled straight than when curved, and one of the bearing members being formed as a separate part and having an end portion semi-circular in cross section, and the link having a substantially semicircular socket opening to receive an end portion of the bearing member, a wedge seated in the socket opening between a wall thereof and the flat wall of the bearing member for adjustment transversely of the link, and means for adjusting the wedge member.

In testimony whereof I hereunto affix my signature in the presence of two witnesses.

CLARENCE LEO BEST.

Witnesses:
R. C. FORCE,
C. F. BRIGHAM.